United States Patent [19]

Early et al.

[11] 4,310,605
[45] Jan. 12, 1982

[54] FUEL CELL SYSTEM

[75] Inventors: Jack Early, Perth Amboy; Arthur Kaufman, West Orange; Alfred Stawsky, Teaneck, all of N.J.

[73] Assignee: Engelhard Minerals & Chemicals Corp., Iselin, N.J.

[21] Appl. No.: 189,466

[22] Filed: Sep. 22, 1980

[51] Int. Cl.³ .............................................. H01M 8/04
[52] U.S. Cl. ...................................... 429/18; 429/26; 429/39
[58] Field of Search ...................... 429/26, 38, 26, 39, 429/18, 34, 12

[56] References Cited

U.S. PATENT DOCUMENTS

| | | | |
|---|---|---|---|
| 3,235,407 | 2/1966 | Nicholson et al. | 429/38 |
| 3,589,941 | 6/1971 | Eaton et al. | 429/38 |
| 3,692,585 | 9/1972 | Mayo | 429/18 |
| 3,709,736 | 1/1973 | Adlhart et al. | 429/24 |
| 3,979,224 | 9/1976 | Strasser | 429/18 |
| 4,233,369 | 11/1980 | Breault | 429/26 |

Primary Examiner—Anthony Skapars

[57] ABSTRACT

A fuel cell system is comprised of a fuel cell module including sub-stacks of series-connected fuel cells, the sub-stacks being held together in a stacked arrangement with cold plates of a cooling means located between the sub-stacks to function as electrical terminals. The anode and cathode terminals of the sub-stacks are connected in parallel by means of the coolant manifolds which electrically connect selected cold plates. The system may comprise a plurality of the fuel cell modules connected in series.

The sub-stacks are designed to provide a voltage output equivalent to the desired voltage demand of a low voltage, high current DC load such as an electrolytic cell to be driven by the fuel cell system. This arrangement in conjunction with switching means can be used to drive a DC electrical load with a total voltage output selected to match that of the load being driven. This arrangement eliminates the need for expensive voltage regulation equipment.

19 Claims, 9 Drawing Figures

FUEL CELL SYSTEM

The Government has rights in this invention pursuant to Grant No. DE-ACO3-76SF-01240 awarded by the U.S. Department of Energy.

BACKGROUND AND SUMMARY OF THE INVENTION

For a long time there has been the need in the art for a direct current power supply which provides a load matching capability for driving a variety of electrical loads. Present day devices for supplying power to direct current loads employ voltage regulators. Conventional voltage regulation means are expensive and generally include undesirable power losses.

The present invention relates to the provisions of a direct current power supply made up of fuel cell modules and constructed to perform a voltage regulation function. Such a construction, for example, might be used to supply power to electrolytic cells or for battery charging.

To this end, the fuel cell system of the invention comprises at least one fuel cell module including a plurality of sub-stacks of fuel cells held together in a stacked arrangement, with each of the sub-stacks including a plurality of fuel cells connected in series and having cathode and anode terminals at the ends thereof. Means are provided for connecting together the anode and cathode terminals, respectively, in a parallel connection. By this arrangement the fuel cell system produces at power output terminals a voltage output the same as the voltage of each of the sub-stacks.

More particularly, the invention involves an arrangement wherein the cathode and anode terminals are provided by the module cooling means in the form of cold plates positioned between each of the sub-stacks. There are provided negative and positive coolant manifold means connected to the cold plates for providing the parallel electrical connection, with current take-off means being connected to the manifold means.

In a typical arrangement for providing a voltage regulation function, a plurality of said modules are electrically connected in series and switching means are provided for connecting a preselected number of said modules to the power output terminals of the fuel cell system. In another arrangement, sub-stacks as described above may be electrically connected in series and switching means provided for connecting a pre-selected number of said sub-stacks to the power output terminals of the fuel cell module. In accordance with another aspect of the invention, a fuel cell system is used in combination with an electrolytic cell system having operating voltage and current demand characteristics matched by the operating voltage and current output characteristics of the fuel cell system. This combination includes means for connecting the power output terminals of the fuel cell system to the power input terminals of the electrolytic cell system. In this arrangement, the fuel cell system drives the electrolytic cell system at desired operating voltage and current conditions.

It will be apparent that in the above-described combination the switching means functions to provide stepwise voltage control for use in matching the incremental voltage requirements of the electrolytic cells. Moreover, this arrangement comprises a "natural" match, i.e. one that does not require any voltage conditioning or regulating means.

DETAILED DESCRIPTION OF THE PREFERRED EMBODIMENTS

Figure 1:
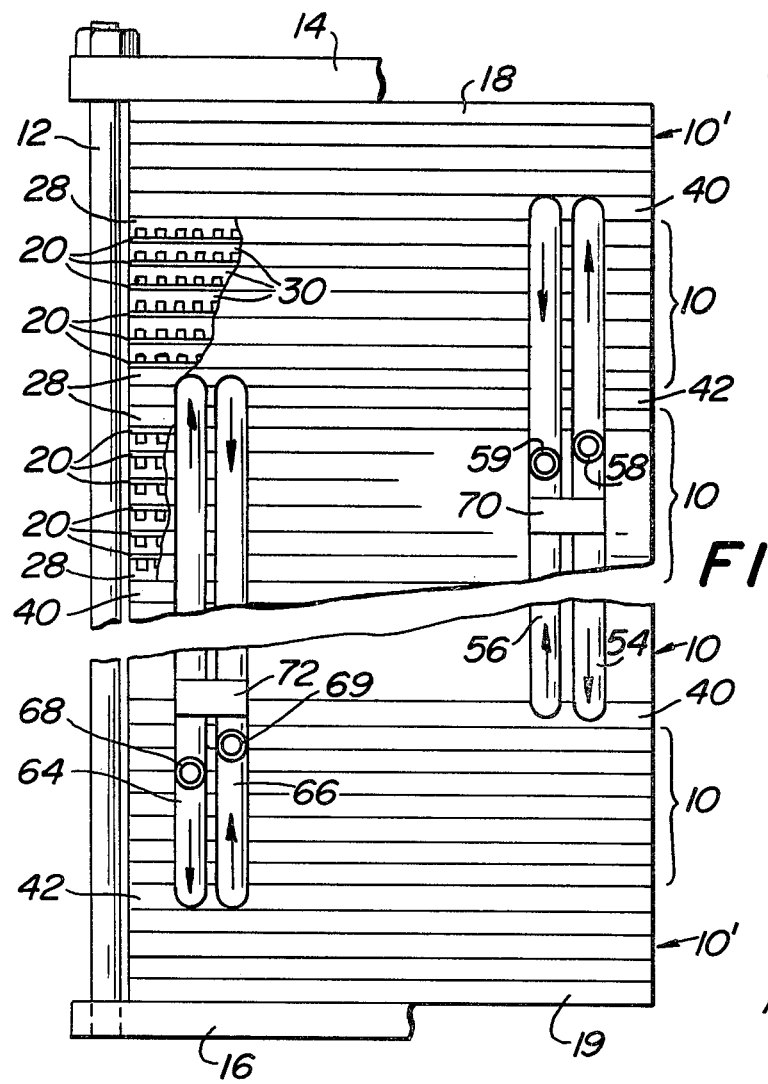
FIG. 1 is a schematic illustration of a fuel cell module in accordance with the invention with various parts broken away for clarity of illustration.

Referring to FIG. 1, a fuel-cell module in accordance with the invention comprises a plurality of sub-stacks 10 of fuel cells (also referred to herein as cell laminates) held together in a stacked arrangement by means of tie rods 12 extending between top hold down bars 14 and bottom hold down bars 16. Each sub-stack 10 comprises six fuel cells each bounded by bipolar plates and electrically connected in series in a conventional manner. In the embodiment of the invention shown in FIG. 1, one of the sub-stacks 10' has its six cells divided in half and comprises three fuel cells at the top of the module and three fuel cells at the bottom of the module electrically connected in series by means of a top terminal plate 18 and a bottom terminal plate 19 which are connected together electrically. It will thus be apparent that sub-stack 10' has the same total number of fuel cells as the sub-stacks 10 but a different arrangement thereof. It is to be understood that the invention is not limited to a particular number or arrangement of the fuel cells, and that these elements of construction can be varied within the scope of the invention as described herein.

Figure 2:
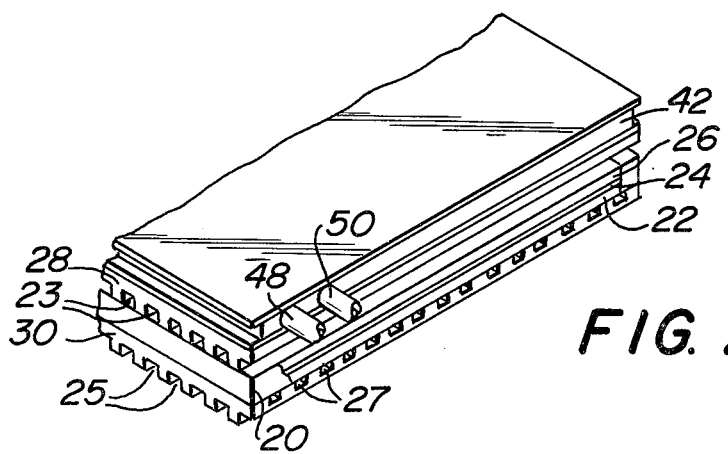
FIG. 2 is a schematic isometric breakaway view showing a single cell in combination with a bipolar plate and a cold plate.

The construction and arrangement of the cell laminates and bipolar plates can take various forms as is well known in the art, and, by way of example, may be similar to that shown in U.S. Pat. No. 3,709,736 to which reference is made for details of construction. Referring to FIG. 2, each cell laminate or fuel cell 20 is made up of three elements, namely, an anode 22, an electrolyte member 24 and a cathode 26. The electrolyte member 24 consists of an immobilized electrolyte, such as phosphoric acid, retained in a microporous matrix, this type of electrolyte member being described in detail in U.S. Pat. No. 3,453,149. It will be apparent that electrolyte member 24 may take various forms known in the art and the description thereof in this specification is by way of example only.

The cell laminates are located between bipolar plates which are, in effect, bridges providing electrical series connection between adjacent cells. The bipolar plates are also gas impervious from one side to the other and are thermally and electrically conductive plates made of a material such as graphite for example. FIG. 2 shows the arrangement of the cell laminate 20 at the top of a sub-stack 10. In the form of the invention shown in FIG. 2, gas access is provided by grooves in the faces of the bipolar plates. It is to be understood that other forms of construction may be used and are within the scope of the invention.

Cell laminate 20 is bounded by an end termination plate 28 and an intermediate bipolar plate 30. The termination plates 28 are provided at the upper and lower ends of a sub-stack 10 of cell laminates 20 and are similar to bipolar plates 30 except that only one side is in contact with a cell laminate; and the bipolar plates 30 are provided between the cell laminates 20 in each sub-stack 10. Another important function of the termination plates 28 and the bipolar plates 30 is to provide for the access of the reactant gases to reach the electrode surfaces of the cell laminates 20 while supporting and separating the adjacent cell laminates 20. Since the end termination plates 28 serve only one electrode, the surfaces of the termination plates 28 that are adjacent an electrode are the only ones that must have provision reactant gas flow access, and the other surface may be flat and smooth to provide maximum thermal and electrical contact with cold plates provided at the ends of the sub-stacks 10 in accordance with the invention. The bipolar plates 30 serve two electrodes and, to this end, must be provided with flow passages for gas access on both surfaces thereof. Such a construction is illustrated in FIG. 2 and, as an example, is described in detail in said U.S. Pat. No. 3,709,736, in which case a groove construction is used to provide gas access. As is described in said patent, the air flow arrangement is such that ambient air enters each cell through grooves such as grooves 23 and 25 in plates 28 and 30, respectively, and flows through the cell to provide oxygen to the cathode, picking up heat and moisture before leaving the cell from the opposite side. As is shown in FIG. 2, the fuel flow is perpendicular to the air flow, which is a convenient configuration for the simple manifolding of the feeds of reactant gases to the cells. The air enters the cell laminate on the edge of the bipolar (and termination) plates and in a direction concurrent with the path of the grooves 23 and 25 and leaves the cell at an elevated temperature on the opposite side. The fuel, typically hydrogen, enters the cell through grooves such as the grooves 27 in plates 30 and flows in a direction perpendicular to the air flow. As one example of this construction, the details of the manifolding of the gas flow and the provision of seals to control the flow of the reactant gases is shown and described in detail in said prior-mentioned U.S. Pat. No. 3,709,736. Briefly, the air flows of every two cells are combined and are separated from the air flow of the adjacent two-cell groups by long spacers between each second set of bipolar plates. The alternate bipolar plates are separated by short spacers. The long spacers serve to form manifold chambers alternately for incoming and outgoing air. The fuel flow is directed to the stack in such a way that the groups of cells are in series. This permits maximum utilization of the hydrogen in dilute hydrogen streams. It is to be understood that various manifolding constructions known in the art may be used within the scope of the invention and that the above description is by way of example.

While the fuel cell system described herein calls for the use of a hydrogen-containing fuel and air as the oxygen-containing reactant gas, it will be apparent that the fuel system may also utilize other hydrocarbons such as propane or a light naphtha in accordance with well-known fuel cell systems.

In accordance with the invention there are provided thin, flat cold plates located between each sub-stack 10 to be in electrical and thermal contact with the termination plates 28 of each sub-stack. The cold plates are indicated at 40 and 42 and form a part of the cooling means for the fuel cell module. Cold plates 40 and 42 are positioned alternately between the sub-stacks 10 for a purpose which will be apparent hereafter.

Referring to FIG. 1, the cell laminates of the sub-stacks 10 are arranged electrically in series to provide for common cathode termination and common anode termination between adjacent sub-stacks 10. The split sub-stack 10' at the top and bottom of the module is arranged in accordance with this scheme as is apparent from FIG. 1.

The cold plates 40 and 42 are constructed to provide cooling passages for the flow of a non-conductive liquid coolant and are made of an electrically conductive material such as aluminum. One satisfactory coolant is Therminol 44, a commercial heat transfer fluid manufactured by the Monsanto Chemical Co. The cold plates 40, in effect, provide anode terminal plates for the stacked arrangement shown in FIG. 1 and the cold plates 42, in effect, provide cathode terminal plates for this arrangement.

Figure 4:
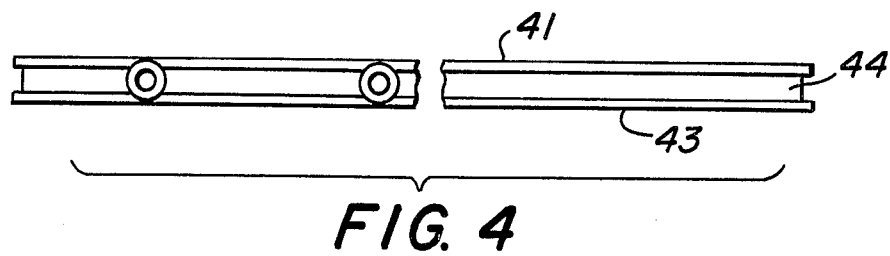
FIG. 4 is an end view of a cold plate.
Figure 5:
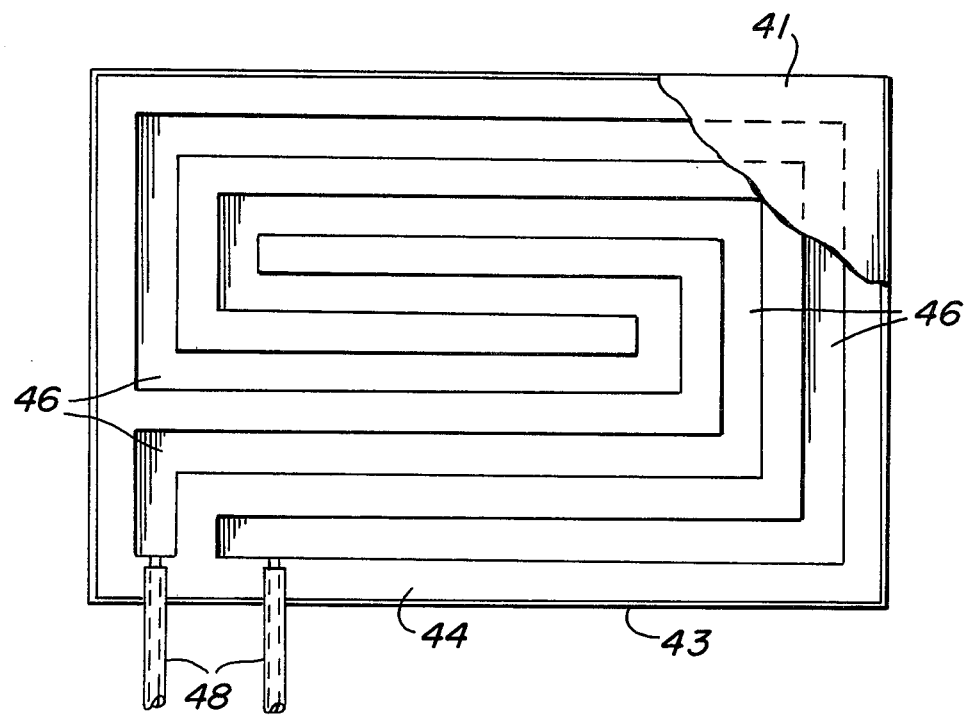
FIG. 5 is a top view of the cold plate shown in FIG. 4.

The cold plates 40 and 42 may be constructed in various ways well known in the art. One type of cold plate construction is shown in detail in FIGS. 4 and 5. This cold plate is comprised of a top cover 41, a bottom cover 43, and an intermediate portion 44 constructed to provide a serpentine-shaped cooling passage 46 between the covers 41 and 43. A pair of tubes 48 are mounted at one end portion of the cold plate to communicate with the ends of the cooling passage 46, as is shown in FIG. 5. The tubes 48 serve as inlet and outlet conduits for the cold plate as will be described more fully hereafter.

The cooling means for the fuel cell module shown in FIG. 1 also comprises coolant manifolds for the flow of coolant liquid into and out of the cold plates 40 and 42. To this end, there is provided positive polarity inlet and outlet coolant manifolds 54 and 56, respectively, associated with cold plates 40. Inlet manifold 54 is supplied with coolant liquid through an inlet 58 for supplying cold plates 40 and outlet manifold 46 delivers the coolant liquid from the cold plates 40 by way of an outlet 59. There is also provided negative polarity inlet and outlet coolant manifolds 64 and 66, respectively, associated with cold plates 42. Inlet manifold 64 is supplied with a coolant liquid through an inlet 68 for delivery to the cold plates 42 and outlet manifold 66 delivers the coolant liquid from the cold plates through an outlet 69.

By this construction, the cold plates 40 and 42 and manifolds 58, 59 and 68, 69 provide a convenient means for tapping the voltage from the fuel cell module. Thus, the positive coolant manifolds 58, 59 are provided with a current take-off connection 70 and the negative coolant manifolds 68, 69 are provided with a current take-off 72. Accordingly, the sub-stacks 10 are connected electrically in parallel and are adapted to provide a power output corresponding to the voltage of the sub-stacks 10 by means of an electrical connection to the current take-offs 70 and 72.

It will be evident that in accordance with the invention cold plates 40 and 42 serve as both current collectors and cooling plates. If desired, thin plates which serve only as current collectors may be used in place of the cold plates 40 and 42. It is also within the scope of the invention to use cold plates 40 and 42 in combination with thin current collector plates.

Figure 3:
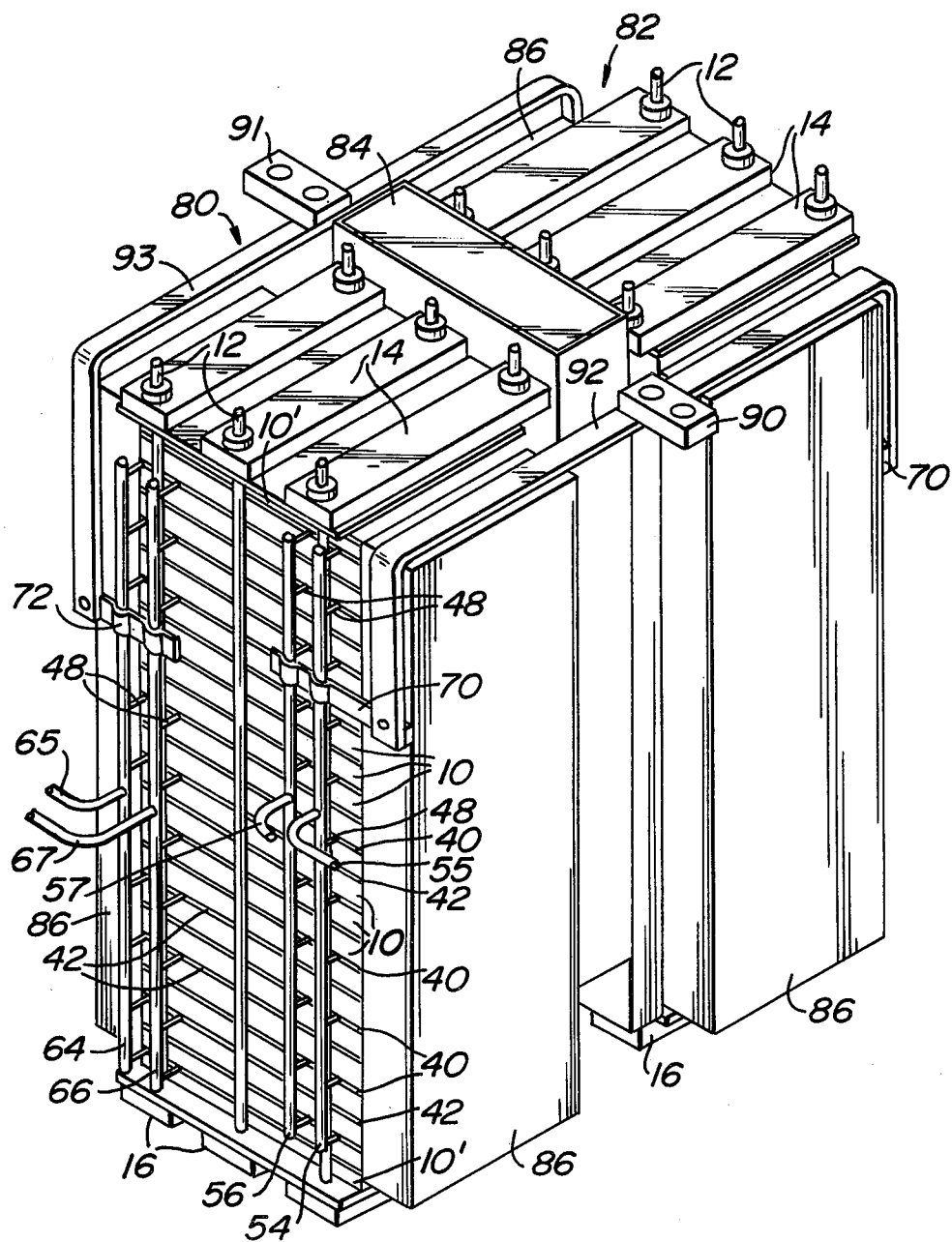
FIG. 3 is an isometric view of a fuel cell module in accordance with the invention arranged in two stacks.

In FIG. 3 there is shown a fuel cell module designed in accordance with the invention and in which there are provided, as an example, two stacks of fuel cells, indicated generally as 80 and 82. Each of the stacks 80 and 82 is comprised of parts constructed and arranged similar to the fuel cell stack shown schematically in FIG. 1, wherefore corresponding parts have been given like reference numerals. Also, stacks 80 and 82 are identical in construction so that only stack 80 will be described herein in detail. It is to be noted that various parts of the fuel cell module shown in FIG. 3 have been omitted for the sake of clarity of illustration. For example, parts of the manifolding have been deleted to provide a clear illustration of the cold plate voltage tap arrangement.

Stack 80 comprises a plurality of fuel cell sub-stacks 10 each comprised of six series-connected cell laminates bounded by bipolar plates as described with reference to FIG. 1. One of the sub-stacks 10' is split into three cell laminates at the top and three cell laminates at the bottom as described with reference to FIG. 1. The sub-stacks 10 and 10' are held together in a stacked arrangement by means of six tie rods 12 extending between top hold down bars 14 and bottom hold down bars 16.

An air inlet duct 84 is provided between opposed ends of stacks 80 and 82 and hydrogen manifolds 86 are provided adjacent the other ends of stacks 80 and 82.

There are provided cold plates 40 and 42 for the cooling system and such plates are positioned alternately between the sub-stacks 10 as is shown in FIG. 3. The cell laminates of the sub-stacks 10 are arranged to provide for common cathode termination and common anode termination as described with respect to FIG. 1 wherefore cold plates 40 provide anode termination plates and cold plates 42 provide cathode termination plates for stack 80.

Positive polarity inlet and outlet manifolds 54 and 56 are connected to the tubes 48 of cold plates 40 so that inlet manifold 54 delivers coolant liquid supplied thereto from a supply line 55 to the passage 46 (FIG. 4) of the cold plates 40 and outlet manifold 56 discharges coolant liquid from passage 46 of cold plate 40 to a return line 57.

Negative polarity inlet manifolds 64 and 66 are connected to the tubes 48 of cold plates 42 so that inlet manifold 64 delivers coolant liquid supplied thereto from a supply line 65 to the internal passage 46 (FIG. 4) of cold plate 42 and outlet manifold 66 discharges the coolant liquid from said passage to a return line 67.

A positive module tap 90 is connected to a bus-bar 92 which is, in turn, connected to the positive polarity manifolds 54 and 56 of each of the stacks 80 and 82 by current take-off straps 70. Similarly, a negative module tap 91 is connected to a bus-bar 93 which is, in turn connected to the negative polarity manifolds 64 and 66 of each of the stacks 80 and 82 by current take-off straps 72.

In this manner, the cold plates 40 and 42 and their associated manifolds 54, 56 and 64, 66 provide a convenient means for tapping the voltage of the fuel cell module shown in FIG. 3. The arrangement is such that the sub-stacks 10 are connected electrically in parallel so that the fuel cell module provides a voltage output corresponding to the voltage of a sub-stack 10. The magnitude of the current will, of course, depend on the current of each sub-stack and the number of sub-stacks connected in parallel. By way of example, a fuel cell module such as that shown in FIG. 3 using cold plates between sub-stacks comprising six cells wherein each cell has a nominal voltage of 0.6 VDC provides a nominal voltage for each sub-stack of 3.6 volts thereby also providing a nominal voltage for the module of 3.6 volts. A desired module current of 6000 amperes would be provided by, for example, a total of 40 sub-stacks connected electrically in parallel in the module, each sub-stack having a current of 150 amperes.

In accordance with the invention there may be provided a switching arrangement so that modules of a fuel cell system may be added as needed to increase the voltage output. One such arrangement is shown schematically in FIG. 6.

Figure 6:
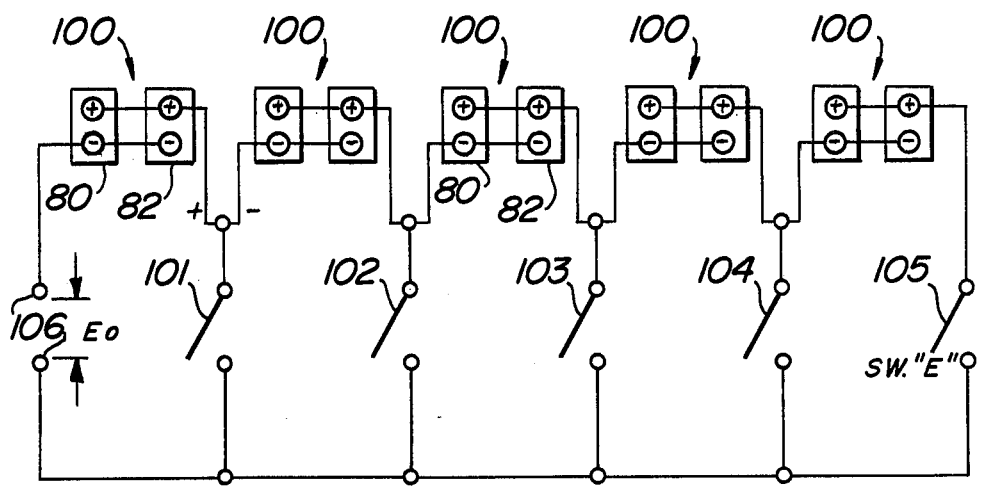
FIG. 6 is an electrical schematic of a switching arrangement for providing a stepwise voltage output.

In the arrangement of FIG. 6, five fuel cell modules 100 of the type shown in FIG. 3 are connected in series with each of the modules 100 comprising two stacks 80 and 82 and providing a voltage output of 3.6 volts. Modules 100 are connected to power output terminals 106 by switching means comprising five switches 101–105 which permit the connection of various numbers of fuel cell modules 100 to the power output terminals 106 in a stepwise manner to increase the voltage output in increments up to the maximum of the sum of the voltages of the five modules. Thus, with the five modules, for example, each providing a nominal voltage of 3.6 volts and with only switch 101 closed, an $E_o$ (potential difference) of 3.6 volts is provided at the output terminals 106. When switch 102 only is closed, an $E_o$ of 7.2 volts is provided at the output terminals 106. When switch 103 only is closed, an $E_o$ of 10.8 volts is provided at the output terminals 106. When switch 104 only is closed, an $E_o$ of 14.4 volts is provided at the output terminals 106. When switch 105 only is closed, an $E_o$ of 18 volts is provided at the output terminals 106.

It is to be noted that if smaller voltage increments are needed, additional voltage taps can be added as required. Also, more complicated switching arrangements may be provided where all the sections of the fuel cell always share the load. Such switching arrangements are within the purview of those skilled in the art.

Figure 8:
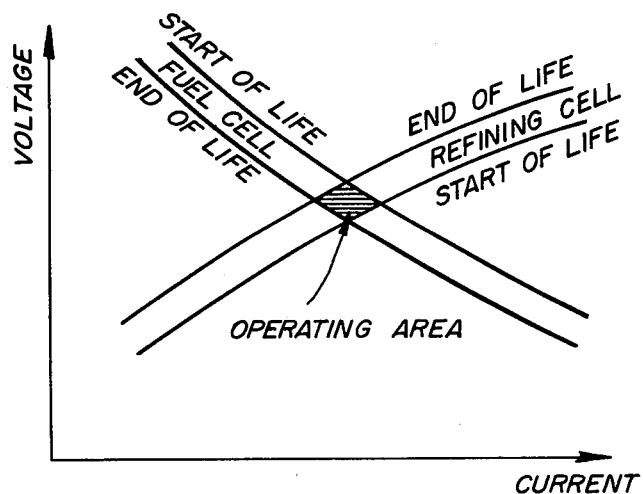
FIG. 8 is a graph showing the characteristic operating curves of a fuel cell and an electrolytic refining cell.
Figure 7:
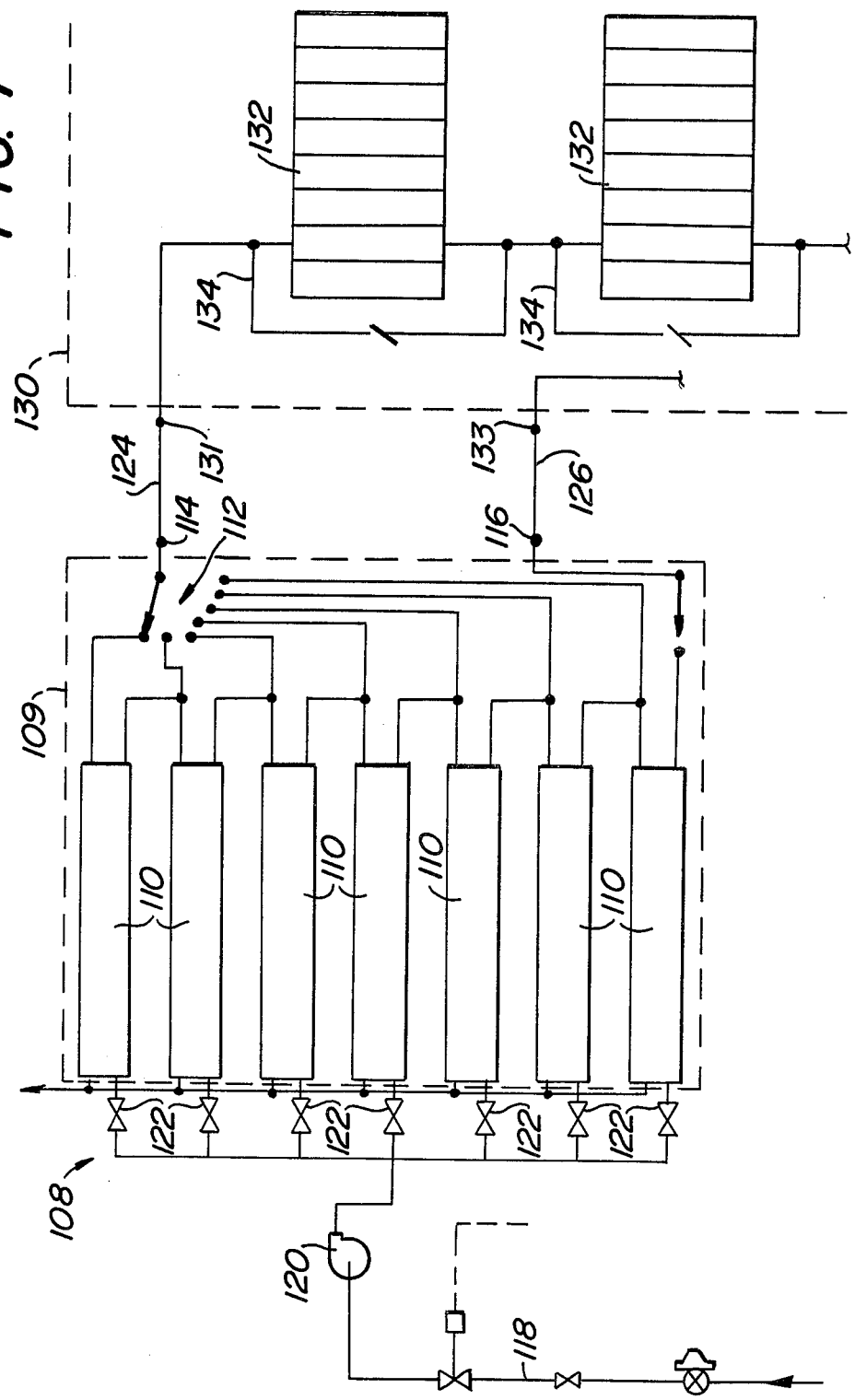
FIG. 7 is a schematic view showing a combination of a fuel cell system and an electrolytic refining cell system.

The fuel cell system of the invention can simplify the supply of electric power to electrochemical processes by reason of the direct supply of DC current which does not require rectification and avoids power losses. Moreover, by reason of the modular design, the fuel cell system of the invention can be designed to directly and naturally match the power requirement of a given electrochemical process. FIG. 7 shows a typical combination of a fuel cell system in accordance with the invention in combination with an electrolytic refining cell system, and FIG. 8 illustrates how the natural matching between the systems is accomplished.

Referring to FIG. 7, the fuel cell system shown therein and indicated at 108 comprises a fuel cell power supply 109 comprising seven fuel cell modules 110 which may be of the type shown in FIG. 3 for example. The modules 110 are electrically interconnected in accordance with the schematic showing in FIG. 6 with the modules 110 being connected in series and associated with a voltage tap selector switch 112 which is adapted to be set in seven different positions to connect any number of the fuel cell modules 110 to the positive and negative output terminals 114 and 116, respectively, of the power supply 109. The fuel cell system 108 also comprises conventional equipment such as the hydrogen supply means which comprises a supply line 118 which supplies hydrogen gas to the fuel cell modules 110 through a metering pump 120 and a plurality of control valves 122 one of which is associated with each module 110.

The output terminals 114 and 116 are connected by lines 124 and 126, respectively, to supply current to an electrolytic cell system 130 at power input terminals 131 and 133. The electrolytic cell system 130 comprises a bank of electrolytic refining cells 132. Although only two cells 132 are shown in FIG. 7, typically there would be provided eight such cells 132 in an actual installation as per this example. Thus, there is provided one more refining cell 132 than the number of fuel cells 110 provided since under typical conditions of operation at least one refining cell 132 would be out of use for maintenance or repair purposes.

Each of the refining cells 132 has associated therewith a bypass circuit means 134 which can be used to short circuit the associated refining cell 132 when it is out of use.

The arrangement shown in FIG. 7 is constructed for the application of stepwise voltage control to match the incremental voltage requirements of each electrolytic refining cell 132 by reason of the modularizing of the fuel cell power supply 109. Thus, the fuel cell power supply 109 is provided as series connected modules 110 with each module being designed for a voltage output equivalent to the desired voltage requirement of a refining cell 132 and each module 110 can be independently switched into or out of the power supply circuit. In addition, the total fuel cell output voltage is provided to match that of the total voltage requirement of the refining cells that would be operational at any given time. The desired operating current is provided by building up the sections of equal voltage sub-stacks connected in parallel within each module to suit the refining cell requirements. In use, the switch 112 is set so that an appropriate number of fuel cell modules 110 are connected to the power output terminals 114 and 116 to suit the number of electrolytic cells 132 to be driven.

FIG. 8 illustrates how the natural matching design in accordance with the invention is accomplished in an electrolytic refining cell installation as shown in FIG. 7. An electrolytic refining cell requires optimum voltage and current conditions to provide maximum production, which is a function of the cell current, at minimum power, which is a function of the required voltage. The specific voltage-current operating point of the electrolytic refining cell is effectively a function of its internal resistance which changes, i.e., increases, during its operation. The curves of voltage-current operating points for electrolytic refining cells are shown in FIG. 8 wherein the "START OF LIFE" and the "END OF LIFE" curves represent operating limits based on decisions as to the desired conditions of operation of the refining cells.

A fuel cell has its own characteristic voltage-current operating curve which is dictated by its specific electrochemical design and operating conditions (including temperature and external load). A fuel cell power supply unit operating curve will, in addition, be determined by its overall electrical configuration as discussed above. A typical fuel cell operating curve is shown in FIG. 8. As is shown in FIG. 8, a given fuel cell operating characteristic changes with time, i.e., the voltage decreases for a given current under given operation conditions.

Both the fuel cell and the electrolytic cell "START OF LIFE" and "END OF LIFE" operating curves are effectively defined in terms of system design requirements. These curves as shown in FIG. 8 are not meant to indicate that either system will cease to function at given operating conditions but only that certain levels of operating conditions are not of interest to a particular installation.

When the fuel cell power supply and electrolytic refining cells are connected, an energy transfer equilibrium point is reached quickly. This point is a naturally common operating condition and represents the intersection of their actual operating curves at that moment. If a fuel cell power supply is properly designed to match the required operating conditions of the refining cell, then this equilibrium point will be a current-voltage point which satisfies both their needs based on economy, production rate, operating life, etc. If the fuel cell system is designed in a manner so that it provides a satisfactory intersecting operating characteristic with the operating characteristic of the electrolytic refining cells then the system will operate with a natural match between the power supply and the electrolytic cell system. Accordingly, there is no need to provide any power conditioning device, such as a voltage regulator or the like, and the arrangement is, in effect, self-regulating. In other words the load placed on the fuel cell system is such that the voltage and current of the system operates at a desired operating point, i.e., in the operating area of the curves shown in FIG. 8. Since the characteristics of the load and the power supply vary during operation, the operating point will change but will remain at some point in the "OPERATING AREA" shown in FIG. 8.

Figure 9:
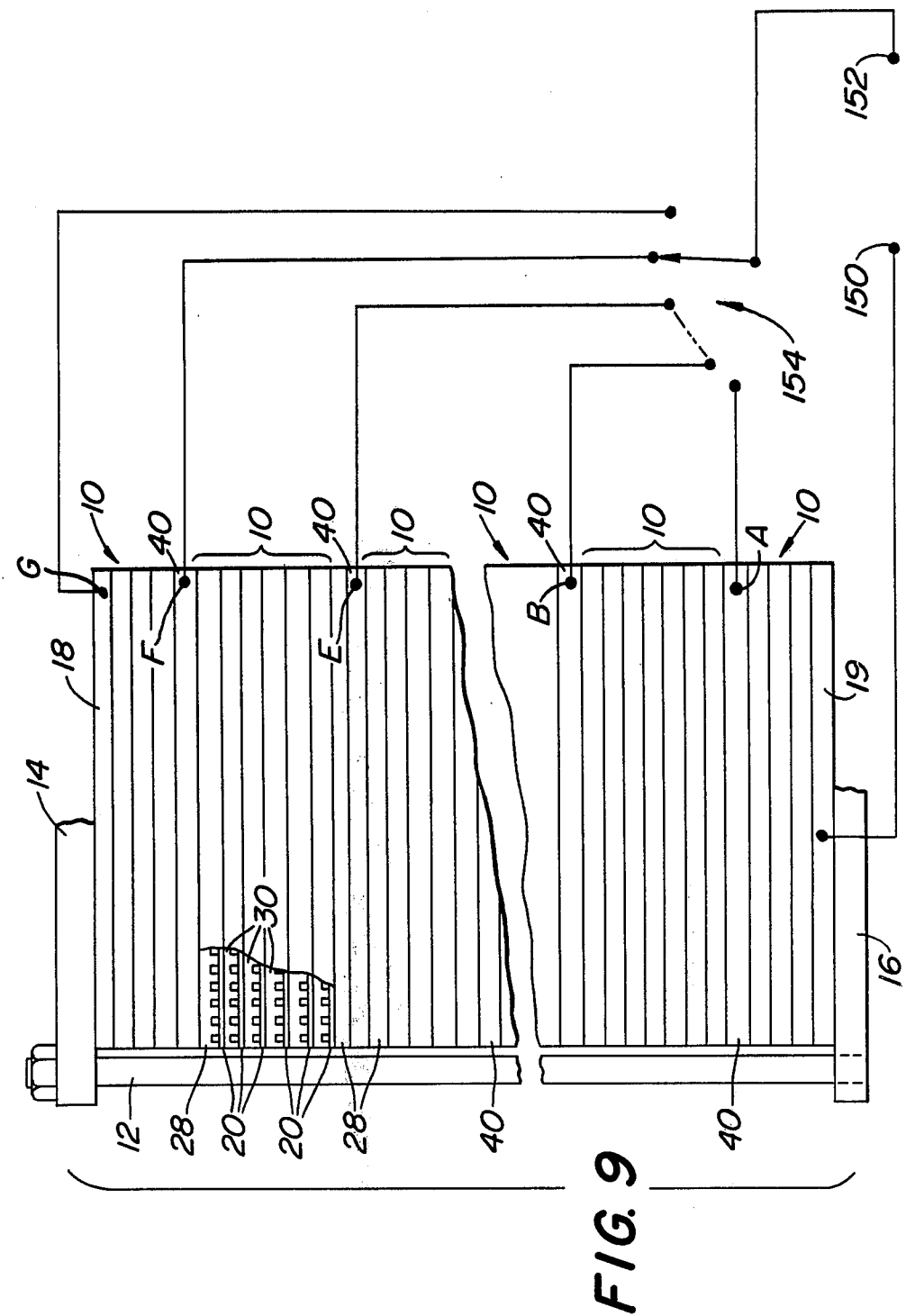
FIG. 9 is a schematic illustration of a fuel cell module in which the sub-stacks are connected electrically in series.

In FIG. 9 there is shown an arrangement of a fuel cell module including a plurality of the sub-stacks 10 as described hereinbefore in which said sub-stacks are electrically connected in series and in which switching means are provided for connecting a preselected number of said sub-stacks 10 to the power output terminals of the fuel cell module. The fuel cell module shown in FIG. 9 is comprised of elements which are the same as those used in the fuel cell module disclosed in FIG. 1 wherefore corresponding parts have been given like reference numerals.

The fuel cell module comprises a plurality of fuel cell sub-stacks 10 held together in a stacked arrangement by means of tie rods 12 and hold down bars 14 and 16 and provided with terminal plates 18 and 18 wherein hold down bar 14 is electrically isolated from terminal plate 18. Each of the sub-stacks 10 comprises a plurality of fuel cells 20 connected together electrically in series and bounded by bipolar plates 28. Cold plates 40 are provided between the sub-stacks 10 and function as means providing a cathode terminal at one end of a sub-stack of the series connected fuel cells and anode terminals at the other end of a sub-stack of the series connected fuel cells, and a means for electrically connecting the sub-stacks in series.

There is provided electrical circuitry, as shown in FIG. 9 for producing at the power output terminals 150 and 152 of the module a current corresponding to the current of a sub-stack 10. There is also provided switching means for connecting a preselected number of the sub-stacks 10 to the power output terminals 150 and 152. To this end, there is provided a selector switch 154 which is adapted to be set at a plurality of different positions to connect any number of the sub-stacks 10 to the power output terminal 152. The power output terminal 150 is connected to the lower end of the module at terminal plate 19. By this arrangement, the electrical circuitry comprises a plurality of current take-offs connected at terminal points A, B, E, F and G (as shown in FIG. 9) to the cold plates 40 and terminal plate 18. The current take-offs are arranged at increasing voltage with the lowest voltage being at terminal A and the highest being at terminal G in the arrangement shown in FIG. 9. While only five current take-offs are shown in FIG. 9, it will be apparent that a current take-off is provided for each sub-stack in the fuel cell module.

It will be apparent that various changes may be made in the construction and arrangement of parts without departing from the scope of the invention as defined by the claims.

What is claimed is:

1. A fuel cell system comprising:
    a fuel cell module including
        a plurality of fuel cell sub-stacks held together in a stacked arrangement,
        each of said sub-stacks having a plurality of fuel cells connected together electrically in series,
        means providing a cathode terminal at one end of said series connected fuel cells, and
        means providing an anode terminal at the other end of said series connected fuel cells,
        and means for electrically connecting together said anode terminals of said sub-stacks and said cathode terminals of said sub-stacks in parallel,
        said fuel cell system producing at power output terminals a voltage output corresponding to the voltage of a sub-stack.

2. A fuel cell system according to claim 1 wherein said cathode terminals and said anode terminals are provided by cold plates positioned between said sub-stacks, said cold plates providing passages for the circulating flow of coolant through said cold plates.

3. A fuel cell system according to claim 2 wherein said means for electrically connecting said cathode and anode terminals in parallel comprises a negative polarity coolant manifold means connected to said cold plates providing said cathode terminals, and a positive polarity coolant manifold means connected to said cold plates providing said anode terminals.

4. A fuel cell system according to claim 3 including a current take-off connected to each of said negative and positive polarity coolant manifolds.

5. A fuel cell system according to claim 1 including a plurality of said modules electrically connected in series, and switching means for connecting a preselected number of said modules to the power output terminals of the fuel cell system.

6. A fuel cell system according to claim 1 wherein said cathode terminals and said anode terminals are located in alternate relation in the stacked arrangement to provide a common cathode termination and a common anode termination between adjacent sub-stacks, said fuel cells of each substack being arranged with their anodes and cathodes conforming to said common cathode and anode termination arrangement.

7. A fuel cell system according to claim 6 wherein said cathode terminals and said anode terminals are provided by cold plates positioned between said sub-stacks, said cold plates providing passages for the circulating flow of coolant through said cold plates.

8. A fuel cell system according to claim 7 wherein said means for electrically connecting said cathode and anode terminals in parallel comprises a negative polarity coolant manifold means connected to said cold plates providing said cathode terminals, and a positive polarity coolant manifold means connected to said cold plates providing said anode terminals.

9. A fuel cell system according to claim 8 including a current take-off means connected to each of said negative and positive polarity coolant manifolds.

10. A fuel cell system according to claim 9 including at least two of said stacked modules of a plurality of fuel cell sub-stacks mounted in side-by-side relation.

11. A fuel cell system according to claim 9 including a plurality of said modules electrically connected in series and switching means for connecting a preselected number of said modules to the power output terminals of the fuel cell system.

12. A fuel cell system according to claim 2 wherein each of said fuel cell sub-stacks includes bipolar plates on each side of the fuel cells and termination plates at the ends of the sub-stacks, said cold plates being positioned in electrically conductive contact with said termination plates.

13. A fuel cell system according to claim 2 wherein each of said sub-stacks comprises the same number of fuel cells and including an additional sub-stack of the same total number of fuel cells which is divided with some of its fuel cells at the top of the stacked arrangement and the remainder of its fuel cells at the bottom of the stacked arrangement.

14. A fuel cell system according to claim 3 wherein the connections of the negative polarity coolant manifold means and the positive polarity coolant manifold means to said cold plates includes conduit means extending between said cold plate and said manifold means and providing passages for the flow of coolant into and out of said cold plates.

15. A fuel cell system comprising: a fuel cell module including a plurality of fuel cell sub-stacks held together in a stacked arrangement, each of said sub-stacks having a plurality of fuel cells connected together electrically in series, means providing a cathode terminal at one end of said series connected fuel cells, and means providing an anode terminal at the other end of said series connected fuel cells, means for electrically connecting together said sub-stacks in series, said fuel cell system producing at power output terminals a current corresponding to the current of a sub-stack, and switching means for connecting a preselected number of said sub-stacks to the power output terminals of the fuel cell system.

16. A fuel cell system according to claim 15 wherein said cathode terminals and said anode terminals are provided by cold plates positioned between said sub-stacks, said cold plates providing passages for the circulating flow of coolant through said cold plates.

17. In combination,
    a fuel cell system including
        a fuel cell module for generating direct current at a preselected voltage and current and supplying the same to power output terminals,
    an electrochemical system having predetermined operating voltage and current demand characteristics,
        said preselected voltage and current of said fuel cell module matching the operating voltage and current output characteristics of said electrochemical system, and means for electrically connecting the power output terminals of said fuel cell system to power input terminals of said electrochemical system whereby said fuel cell system drives said electrochemical system at desired operating voltage and current conditions.

18. The combination of claim 17 wherein said fuel cell system includes a plurality of said fuel cell modules each generating direct current at said preselected voltage and current, and including switching means for connecting a preselected number of said fuel cell modules to the power output terminals of the fuel cell system, said electrochemical system comprising a plurality of electrochemical cells each of which has the same operating voltage and current output characteristics, said preselected voltage and current of each of said fuel cell modules matching the operating voltage and current output characteristics of the electrochemical cells.

19. The combination according to claim 18 wherein said fuel cell modules are connected in series and said switching means includes a voltage tap selector switch adapted to connect various numbers of said fuel cell modules to said power output terminals of the fuel cell system to provide a stepwise voltage output.

* * * * *